United States Patent [19]

Carmine

[11] Patent Number: 4,803,831
[45] Date of Patent: * Feb. 14, 1989

[54] ATTACHMENT TO A LAWN TRIMMER

[76] Inventor: Benjamin C. Carmine, 415 Shadow Creek Dr., Seabrook, Tex. 77586

[*] Notice: The portion of the term of this patent subsequent to Jul. 14, 2004 has been disclaimed.

[21] Appl. No.: 72,790

[22] Filed: Jul. 13, 1987

Related U.S. Application Data

[63] Continuation-in-part of Ser. No. 812,757, Dec. 23, 1985, Pat. No. 4,679,385.

[51] Int. Cl.[4] .............................................. A01D 34/84
[52] U.S. Cl. ...................................... 56/16.9; 56/17.5
[58] Field of Search ...................... 56/12.7, 17.2, 16.7, 56/16.9, 17.4, 17.5

[56] References Cited

U.S. PATENT DOCUMENTS

| | | | |
|---|---|---|---|
| 2,612,741 | 10/1952 | McKay | 56/16.9 |
| 2,648,187 | 8/1953 | Ries | 56/16.9 |
| 2,672,002 | 3/1954 | Nelson | 56/16.9 |
| 2,827,748 | 3/1958 | Simpson | 56/16.9 |
| 2,938,323 | 5/1960 | Livingston et al. | 56/17.2 |
| 3,221,481 | 12/1965 | Mattson et al. | 56/16.9 |
| 3,672,139 | 6/1972 | Duran et al. | 56/202 |
| 3,774,379 | 11/1973 | Mizobata et al. | 56/16.9 |
| 3,788,049 | 1/1979 | Ehrlich | 56/16.9 |
| 3,807,151 | 4/1974 | Rosenthal et al. | 56/16.9 |
| 3,977,078 | 8/1976 | Pittinger, Jr. | 56/16.9 |
| 4,182,100 | 1/1980 | Letter | 56/16.9 |
| 4,224,784 | 9/1980 | Hansen et al. | 56/16.9 |
| 4,316,325 | 2/1982 | Brucker | 56/12.7 |
| 4,364,435 | 12/1982 | Tuggle et al. | 56/17.2 |
| 4,679,385 | 7/1987 | Carmine | 56/16.9 |

Primary Examiner—Paul J. Hirsch
Attorney, Agent, or Firm—Gunn, Lee & Jackson

[57] ABSTRACT

An attachment for temporarily converting a flexible cord-type lawn trimmer to a lawn edger is disclosed. The attachment comprises a base plate for mounting to the housing of the lawn trimmer. The attachment includes an edge guide, a deflection shield, a bracket and wheels mounted to the base plate. The bracket supports a portion of the lawn trimmer housing upon securing the base plate to the lawn trimmer.

19 Claims, 7 Drawing Sheets

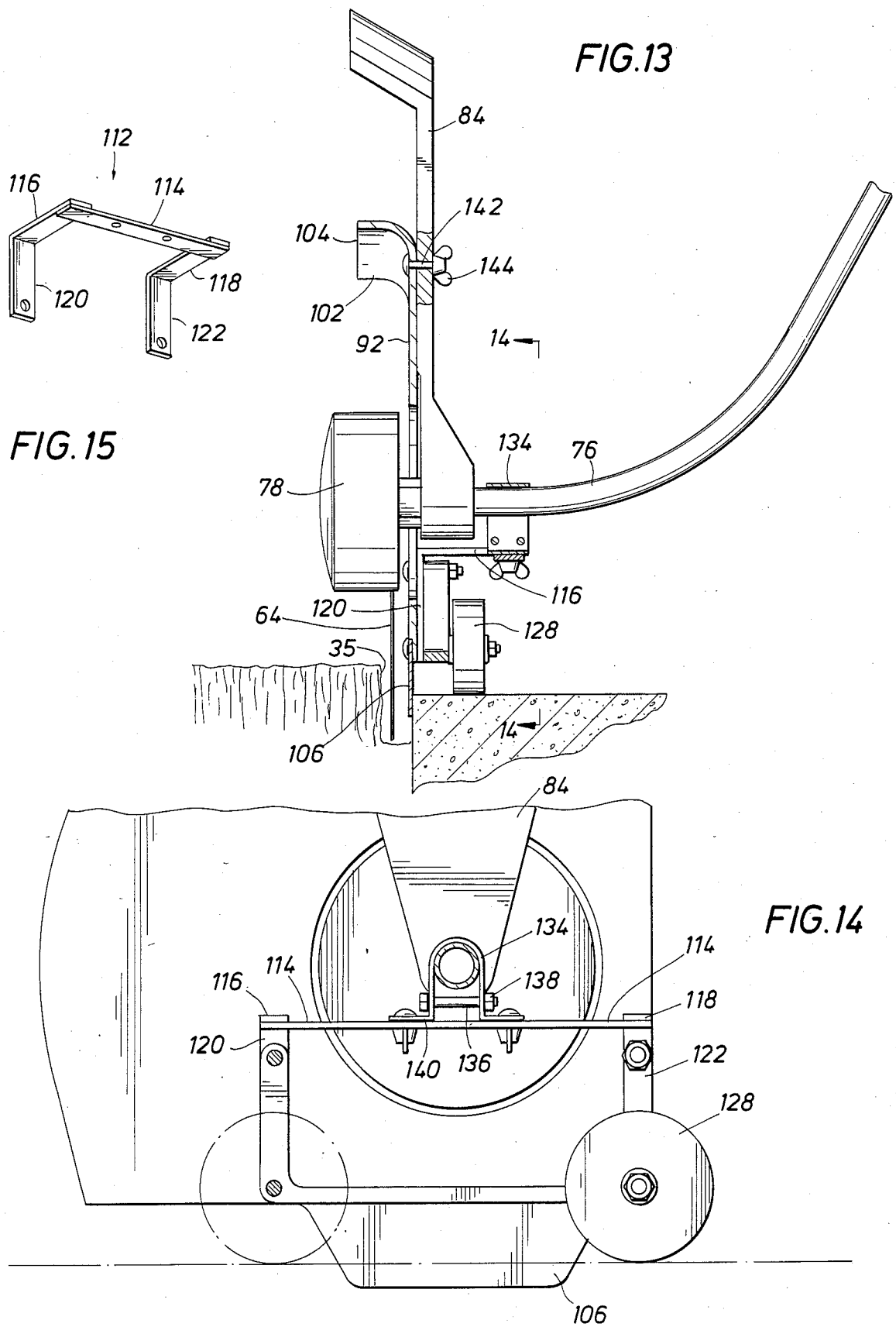

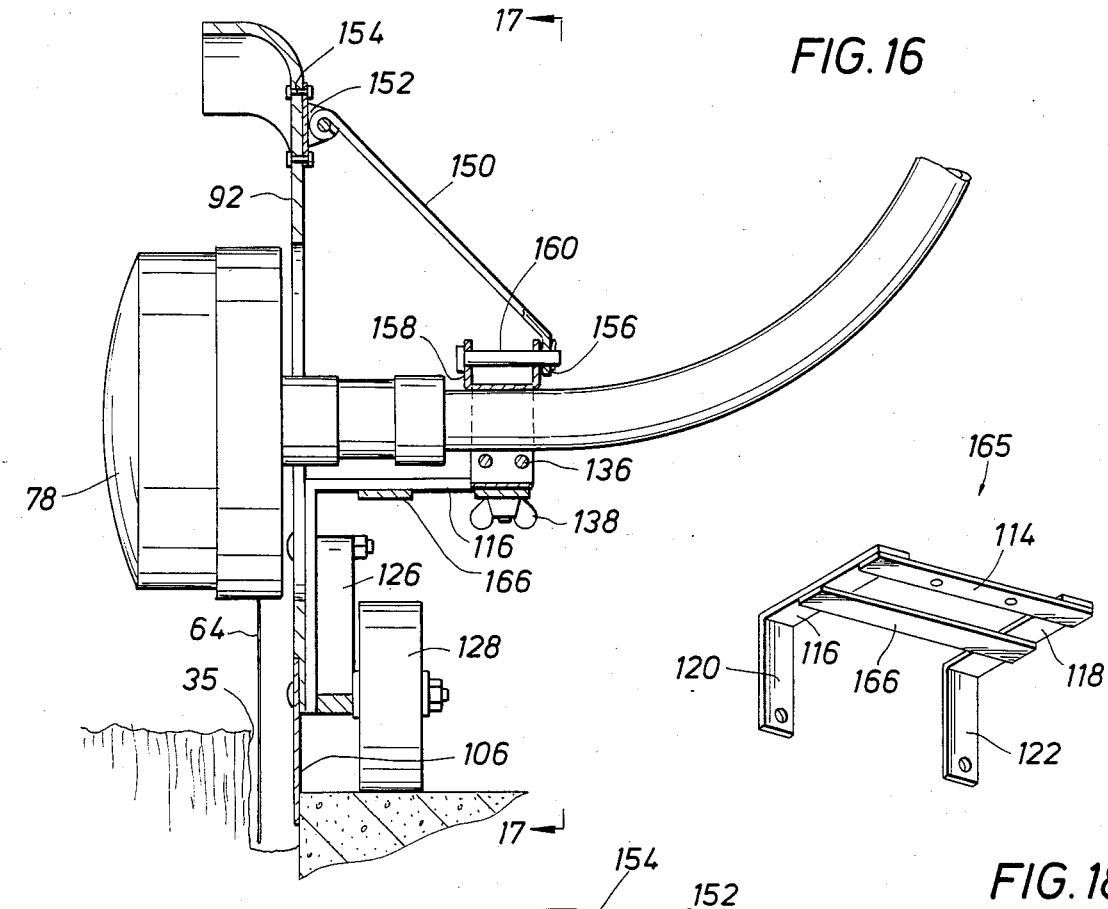
FIG. 16
FIG. 18
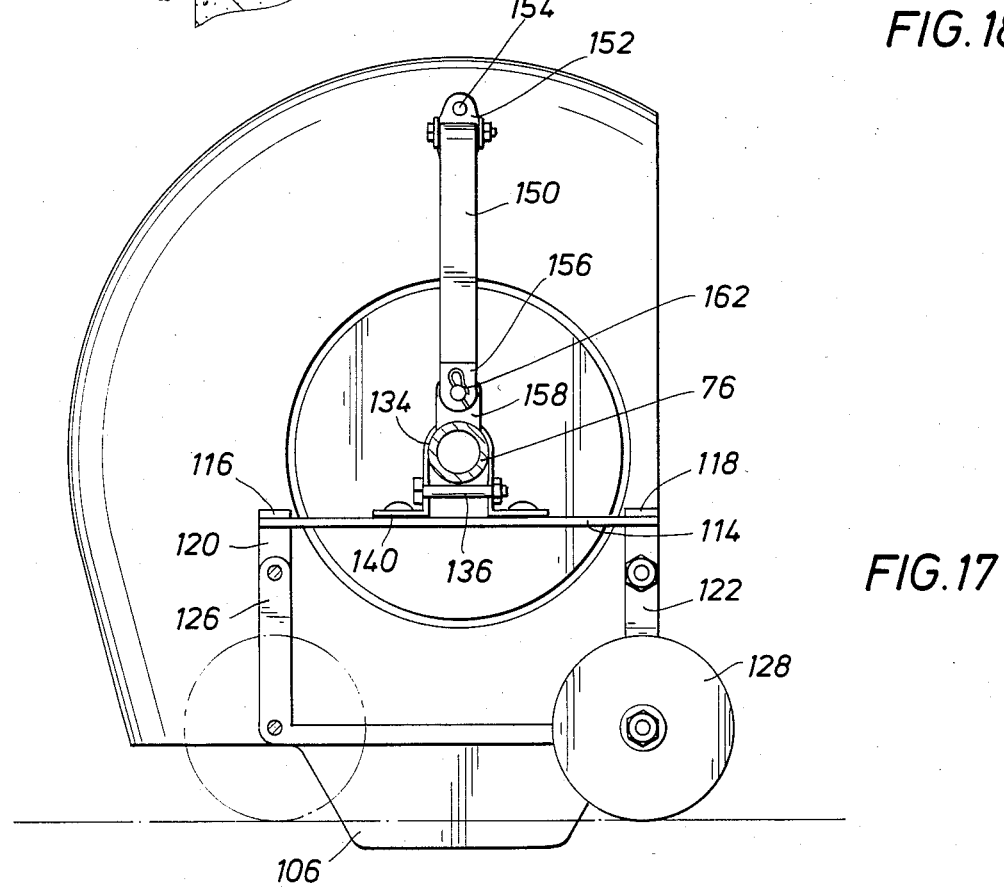
FIG. 17

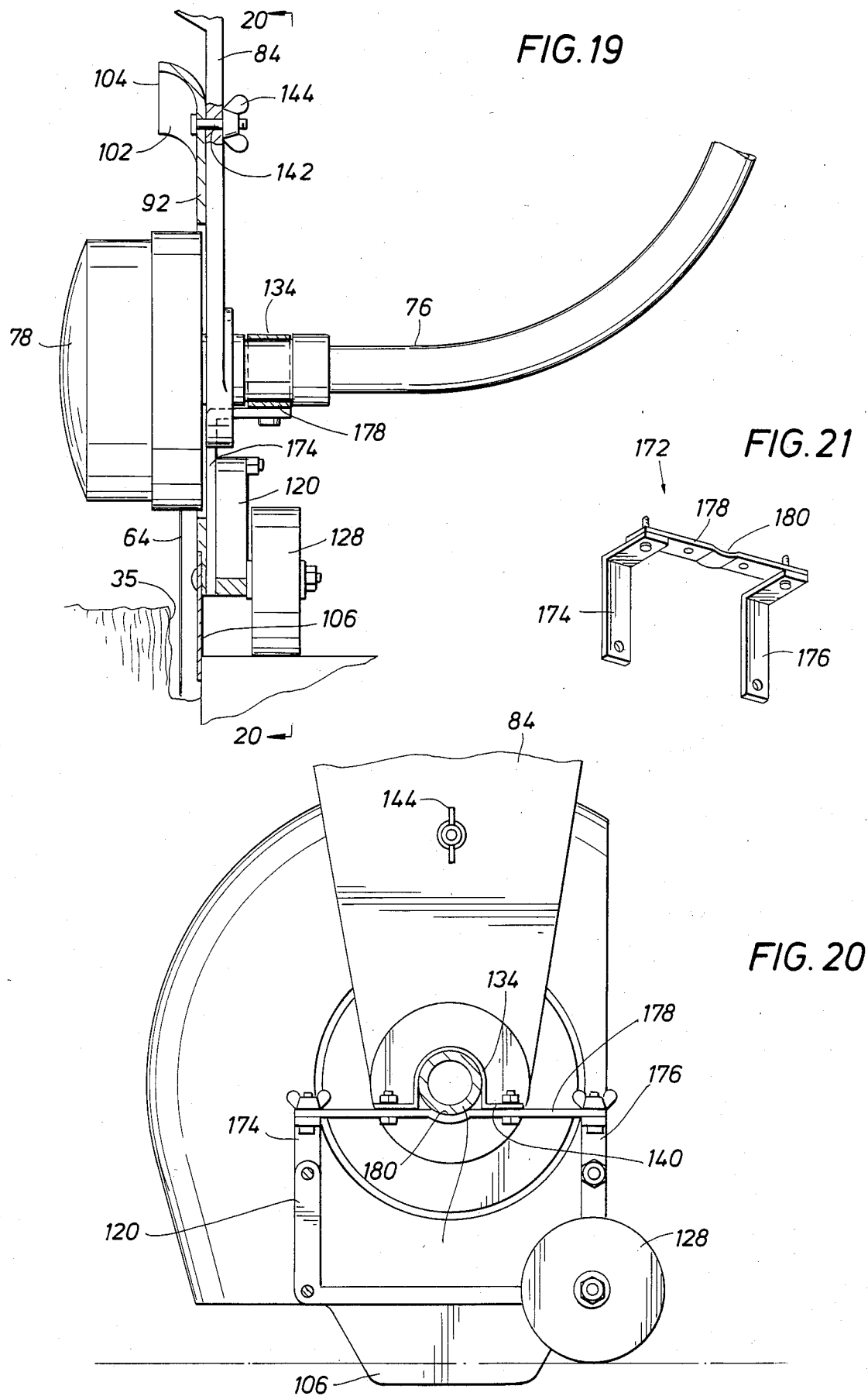

ATTACHMENT TO A LAWN TRIMMER

RELATED APPLICATIONS

This application is a continuation-in-part application of U.S. Ser. No. 812,757, filed Dec. 23, 1985, now U.S. Pat. No. 4,679,385.

BACKGROUND OF THE DISCLOSURE

The present invention is directed to an attachment for a lawn trimmer, particularly, to an attachment for converting a flexible line cord lawn-trimmer to a lawn edger so that the flexible cord of the trimmer may be used for both trimming and edging the lawn.

Lawn edgers, both gasoline and electric powered, have been known and used for many years. Line trimmers, for example, nylon cord trimmers, which have the capability of being used as either a lawn edger or a lawn trimmer are also known in the prior art. However, nylon cord trimmers presently available are difficult to use as lawn edgers because the user must orient the line trimmer so that the orbit of the cutter line is perpendicular to the ground and parallel to the sidewalk or curb being edged. Furthermore, the user must position and hold the line trimmer, while in motion, a sufficient distance above the ground and away from the concrete so that the nylon cord does not strike the concrete or the ground with such force that it wears abnormally.

Typically, nylon cord trimmers presently available include a motor housing having a shaft extending from the housing at an acute angle. A D-shaped handle is generally located about the midpoint of the shaft and a pistol-grip handle having a trigger, which must be depressed to electrically energize the line trimmer motor, is attached to the terminal end of the shaft. When using this type of device as a lawn edger, the housing is rotated so that the grip portion of the handle is facing upwardly. Also, the shaft of the line trimmer must be held by the D-shaped handle in a position so that the motor housing is oriented such that the orbital plane of the cutter line is perpendicular to the ground. This typically requires the user to stoop over and grasp the D-shaped handle with one hand and hold the pistol-grip of the handle in the other hand to keep the line trimmer properly oriented for edging. Since the pistol-grip of the handle is facing upwardly in this position, the user cannot depress the dead-man type switch with his index finger and must therefore press the switch with his thumb. While in this rather awkward position, the user must also walk along the lawn edge, at all times attempting to keep the line trimmer housing properly oriented so that a straight edge can be cut. This is extremely difficult to accomplish and very tiring for the user to maintain such an awkward position for an extended period of time in order to edge the lawn.

Attachments for line trimmers are available as exemplified by U.S. Pat. No. 4,224,784 to Hanson, et al., and other conversion systems disclosed therein. The Hanson device comprises an attachment incorporating a collar with support legs attached to it and wheels attached to the support legs. A U-shaped brace is attached to the support legs holding them at an angle to each other. The collar is positioned about the shaft extending from the line trimmer motor housing. The line trimmer is oriented so that its face is perpendicular to the ground. The collar is secured to the shaft with the head of the line trimmer between the ends of the U-shaped brace and spaced above the ground.

The prior art lawn edging devices have several disadvantages which are overcome by the novel lawn edger attachment of the present disclosure. Edging with the attachment of the present disclosure mounted on a nylon cord trimmer produces a straighter, wider, deeper and cleaner cut than edging with a hand held line trimmer or a conventional metal blade edger. The apparatus of the present disclosure is provided with a downwardly extending edge guide which extends into the trench separating the edge of the sidewalk or curb from the lawn. The edge guide contacts and slides along the vertical surface of the sidewalk or curb, enabling the user to form a cut which is substantially parallel to the sidewalk or curb.

Another significant advantage provided by the apparatus of the present disclosure is safety. Most debris from cutting, including grass, dirt, and small hard objects removed from the area being edged, is deposited back on the lawn, rather than flying onto the sidewalk, street or into the operator's face, eyes or other exposed areas of the body. When edging is performed with a nylon cord trimmer without a deflection shield, flying debris presents a serious danger to the operator and/or passersby. The apparatus of the present disclosure includes a curved deflection shield which directs debris toward the lawn and away from the operator. In addition, when using the present apparatus, the operator walks beside, not behind the lawn edger, further reducing the chance of personal injury.

A further advantage of the apparatus of the present disclosure is the ease of temporarily converting a lawn trimmer into a lawn edger by attaching the apparatus of the present disclosure to the lawn trimmer by means of a single wing nut. The usefulness of the lawn trimmer as a trimmer is not impaired or diminished when the edging apparatus is detached from the lawn trimmer.

SUMMARY OF THE INVENTION

The lawn edger attachment of the present invention comprises a substantially planar base plate which may be mounted to a commercially available flexible line cord lawn trimmer. The base plate includes an aperture formed therein which permits the spool and line housing of the lawn trimmer to extend through the aperture and project beyond the surface of the base plate. A deflection shield extends partially about the base plate and terminates at one end which incorporates a cord cutter. An edge guide extends downwardly from the base plate for guiding the lawn trimmer along the sidewalk or curb. The edge guide cooperates with a trimmer housing bracket and pair of wheels to form a lower assembly for rolling the line trimmer along the edge of the sidewalk. The nose portion of the electric trimmer housing is received in the bracket and a bolt and wing nut secure the opposite end of the base plate to the trimmer housing base, and thereby securely mounting the base plate to the trimmer housing. In an alternate embodiment, the lawn edger attachment is mounted on the shaft of a gasoline powered lawn trimmer adjacent to the spool and line housing or the fixed line cutter head if the trimmer is so equipped.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are, therefore, not to be considered limiting of its scope, for the invention may admit to other equally effective embodiments.

FIG. 13 is a partial sectional view of the lawn trimmer attachment;

FIG. 14 is a partial sectional view of the lawn trimmer attachment taken along line 14—14 of FIG. 13;

FIG. 15 is a perspective view of the mounting bracket of the invention shown in FIGS. 9–14;

FIG. 16 is a partial sectional view of an alternate embodiment of the lawn trimmer attachment;

FIG. 17 is a partial sectional view of the lawn trimmer attachment taken along line 17—17 of FIG. 16;

FIG. 18 is a perspective view of the mounting bracket of the invention shown in FIGS. 16 and 17;

FIG. 19 is a partial sectional view of another alternate embodiment of the lawn trimmer attachment;

FIG. 20 is a partial sectional view of the lawn trimmer attachment taken along line 20—20 of FIG. 19; and FIG. 21 is a perspective view of the mounting bracket of the invention shown in FIGS. 19 and 20.

DETAILED DESCRIPTION OF THE PREFERRED EMBODIMENT

Figure 1:
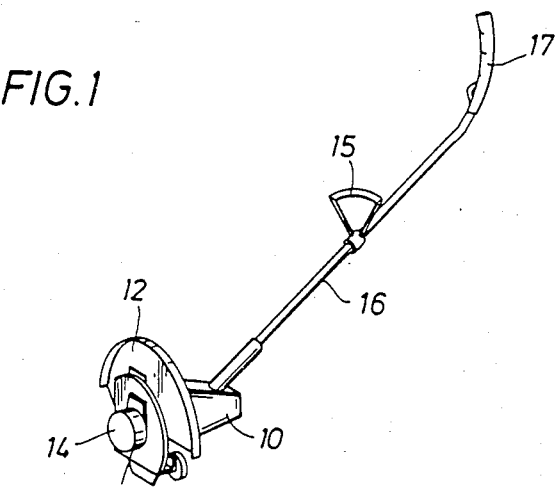
FIG. 1 is a perspective view of the invention as attached to a standard electric powered nylon cord trimmer converting the trimmer to a lawn edger.

Referring first to FIG. 1 of the drawings, the apparatus of the invention is shown mounted to a commercially available electric lawn trimmer. The lawn trimmer includes a trimmer housing 10 supporting a shield plate 12 which is perpendicularly disposed to the trimmer housing 10. A spool and line housing 14 projects outwardly from the flat planar surface of the shield plate 12 and is operatively connected to an electric motor housed within the trimmer housing 10. A shaft 16 extends angularly upwardly from the trimmer housing 10. A D-shaped handle 15 is located at about the midpoint of the shaft 16 providing a convenient hand hold for the operator of the lawn trimmer. A pistol grip handle 17 is also provided at the terminal end of the shaft 16. The description thus far is of a typical, commercially available electric lawn trimmer which during normal usage has the base and shield plate 12 disposed substantially parallel to the ground for grass trimming purposes. In FIG. 1, the trimmer housing 10 of a conventional line trimmer has been rotated so that it is perpendicular to its usual horizontal operating position relative to the ground. The D-shaped handle 15 has also been rotated 180° on shaft 16.

Figure 2:
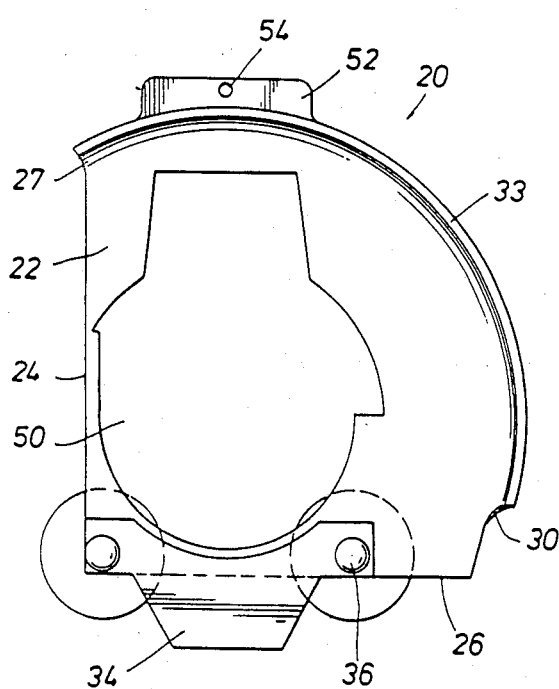
FIG. 2 is a side view of the lawn trimmer attachment of the present invention.
Figure 4:
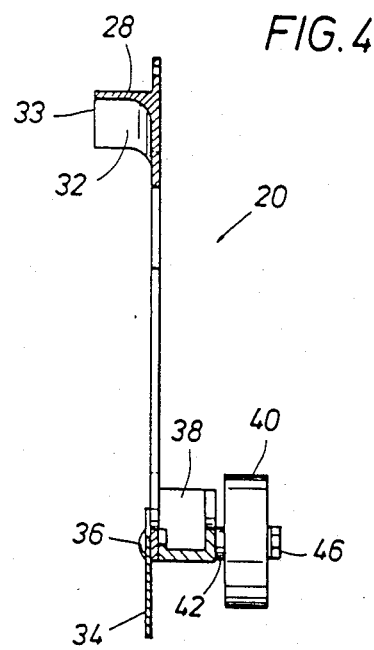
FIG. 4 is a sectional view of the lawn trimmer attachment of the invention taken along line 4—4 of FIG. 2.
Figure 3:
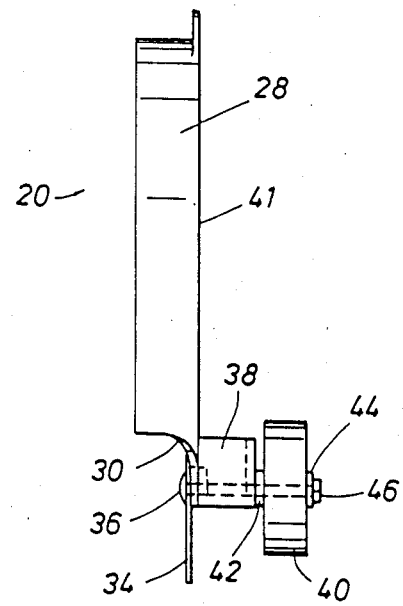
FIG. 3 is an end view of the lawn trimmer attachment of the invention.

Referring now to FIG. 2, the apparatus of the present disclosure is generally identified by the reference numeral 20. The apparatus 20 comprises a substantially flat base plate 22. The base plate 22 is defined by a pair of straight edges 24 and 26 which intersect at right angles forming two sides of the base plate 22. A curved edge 27 joins the straight edges 24 and 26 defining a substantially flat pie-shaped surface. An upstanding deflection shield 28, best shown in FIGS. 3 and 4, is formed along the curved edge 27 extending from the distal or terminal end of the edge 24 to the edge 26. The deflection shield 28 terminates adjacent the edge 26 at an angled surface defining an edge 30 to which a cord cutter is affixed for trimming or cutting excessive lengths of line cord. The deflection shield 28 is integrally formed with the base plate 22 as shown in FIG. 4 and includes a concave interior surface 32 extending upwardly from the base plate 22 and terminating at the edge 33 of the deflection shield 28. The concave surface 32 of the deflection shield 28 enables grass clippings and debris to generally be deflected away from the base plate 22, and thereby away from the user of the lawn trimmer.

Figure 6:
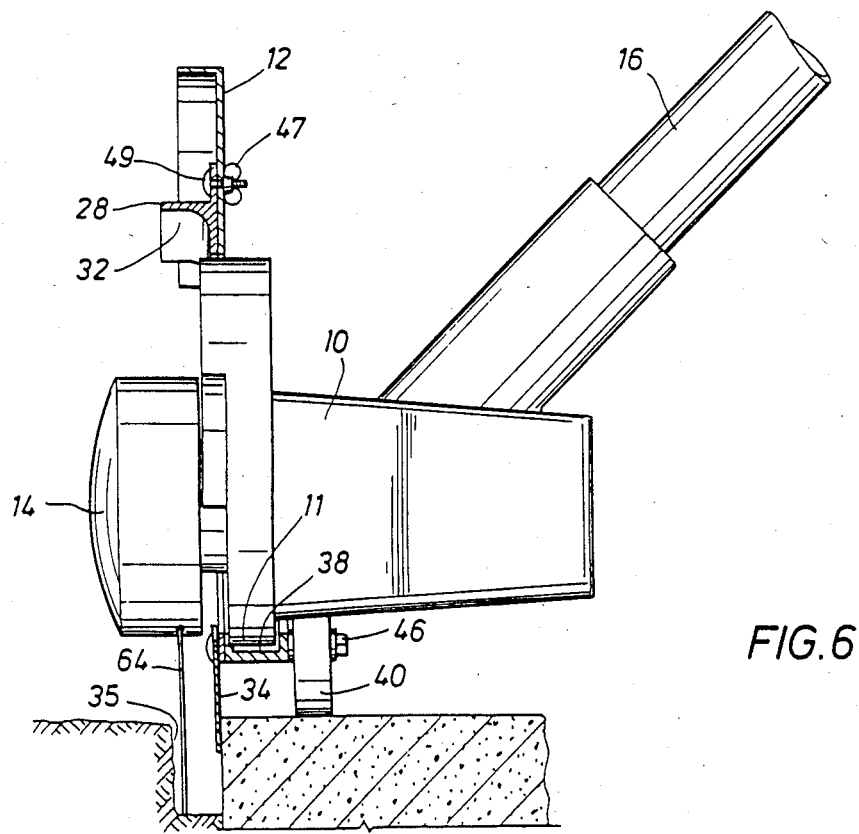
FIG. 6 is a partial sectional view of the lawn trimmer attachment of the invention taken along line 6—6 of FIG. 5.

Referring again to FIG. 2, an edge guide 34 is shown which extends below the edge 26 of the base plate 22. The edge guide 34 is mounted to the base plate 22 by mounting bolts 36. When using the apparatus of the invention, the edge guide 34 extends into a trench 35 formed between the lawn and the sidewalk or curb. The edge guide 34 engages the vertical side of the sidewalk or curb, as best shown in FIG. 6, for guiding the lawn trimmer in a straight path while edging. The trench S5 may be formed by any suitable means, as for example, with an edger having a metal blade, or the apparatus of the present disclosure. Once the trench 35 is formed, it is easily maintained with regular use of the lawn edger of this invention.

Further details of the apparatus 20 are shown in FIGS. 3 and 4. The assembled apparatus 20 includes a bracket 38 and a pair of wheels 40. The wheels 40 are disposed in a parallel relationship with the back face 41 of the base plate 22. The bracket 38 separates the wheels 40 from the base plate 22. The lower assembly of the apparatus 20 comprising the edge guide 34, bracket 38, and wheels 40 is mounted to the base plate 22 by the bolts 36 which extend through aligned holes in the edge guide 34, bracket 38, and wheels 40. A spanner bushing 42 is interposed between the bracket 38 and wheels 40 about the bolt 36 enabling the wheels 40 to freely rotate about the bolts 36. A lock washer 44 and nut 46 secure the wheels 40 about the bolts 36.

The base plate 22 includes an aperture or hole 50 for receiving the spool and line housing 14 therethrough. The hole 50 is sized and shaped to the spool and surrounding structural projections on the shield plate 12 of the trimmer housing 10. The irregular shape of the hole 50 shown in FIG. 2 permits the base plate 22 to fit about an upstanding surrounding border around the spool and line housing 14 of the trimmer housing 10 shown in FIG. 1. It is understood that the size and shape of the hole 50 shown in FIG. 2 is for illustrative purposes only. The hole 50 may be circular, oblong, or any other shape permitting the base plate 22 to lie flat against the substantially flat surface of the shield plate 12. A tab 52 having a hole 54 extending therethrough provides a means for anchoring the top of the base plate 22 to the shield plate 12 of the trimmer housing 10. Anchoring the top of the base plate to the shield plate may also be accomplished by means of a hole through the base plate 22, thus eliminating the tab 52.

Figure 5:
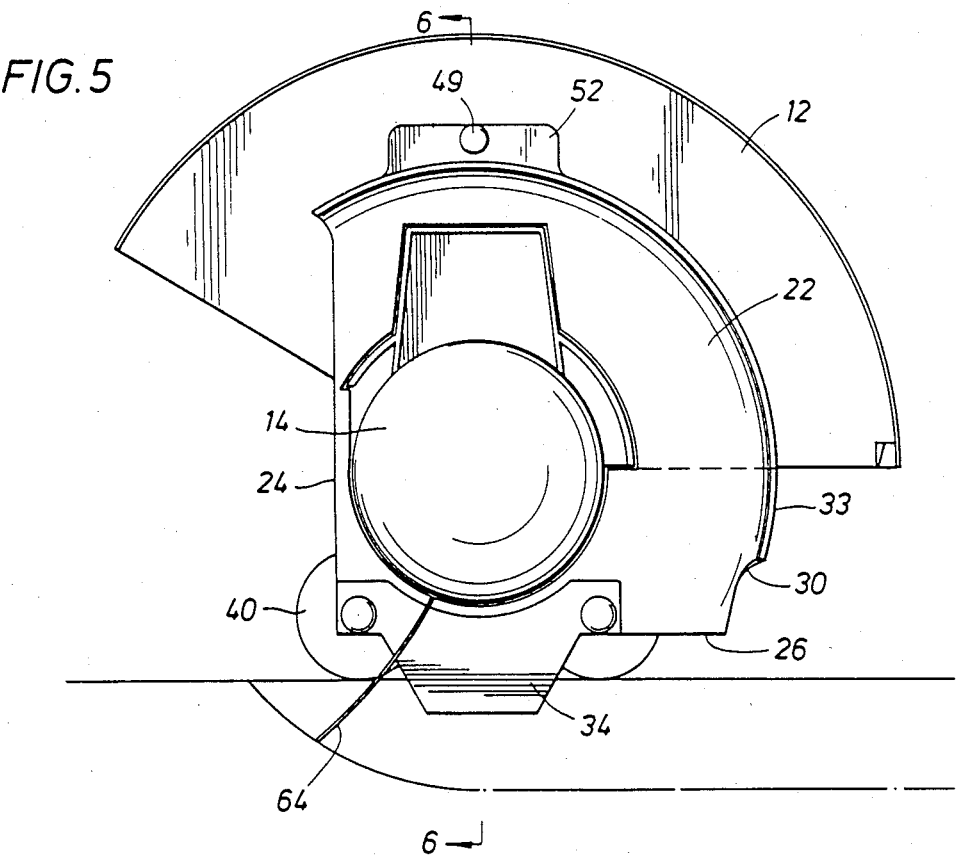
FIG. 5 is a partial, environmental side view of the lawn trimmer attachment mounted to a conventional lawn trimmer.

Referring now to FIGS. 5 and 6, the apparatus 20 of the invention is shown mounted to a conventional, commercially available electric lawn trimmer. Prior to mounting the base plate 22, a hole is drilled through the upper portion of the shield plate 12 in alignment with the hole 54 formed in the tab 52 for receiving a bolt 49 therethrough.

Once a matching hole has been drilled in the shield plate 12, the apparatus 20 may be easily mounted to the trimmer housing 10. The nose portion 11 of the trimmer housing 10 is received in the bracket 38 as shown in FIG. 6. The base plate 22 is pressed against the shield plate 12 and the hole 54 is aligned with the hole previously formed through the upper portion of the shield plate 12. The bolt 49 is positioned so that it extends through the aligned holes. A wing nut 47 threaded onto the bolt 49 extending through the shield plate 12 and hole 54 of the tab 52 anchors the upper end of the base plate 22 to the shield plate 12. In this manner, the base plate 22 is securely mounted to the motor housing 10 and the conversion of a lawn trimmer to a lawn edger is complete.

Figure 7:
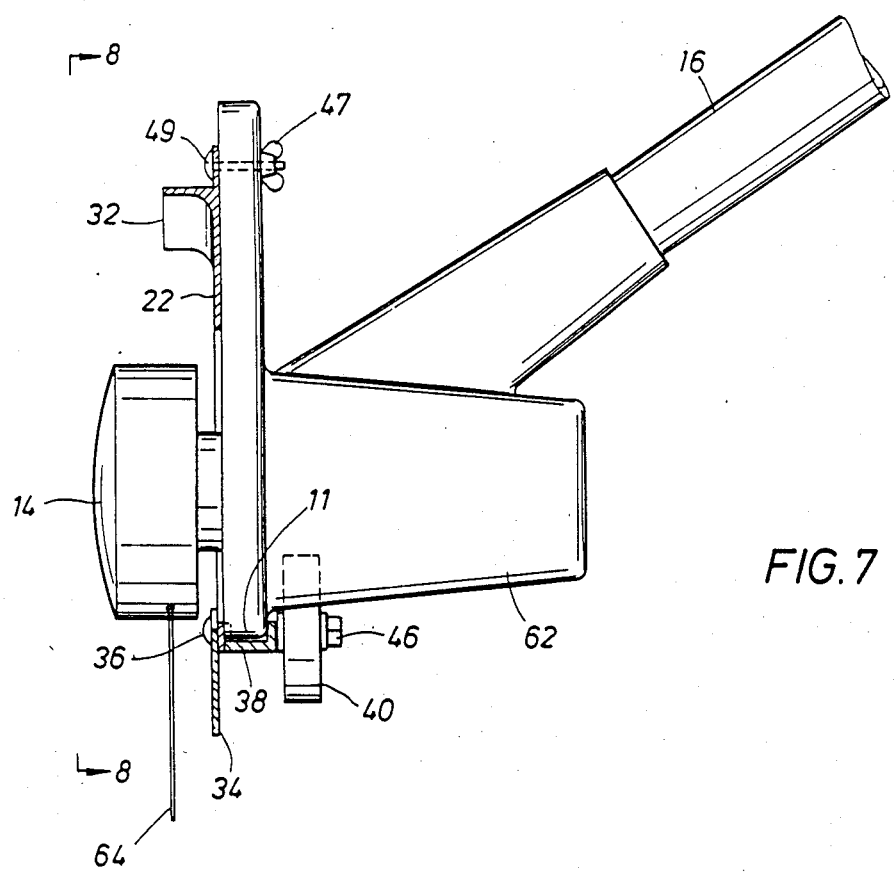
FIG. 7 is a partial sectional view of an alternate embodiment of the lawn trimmer attachment of the invention.
Figure 8:
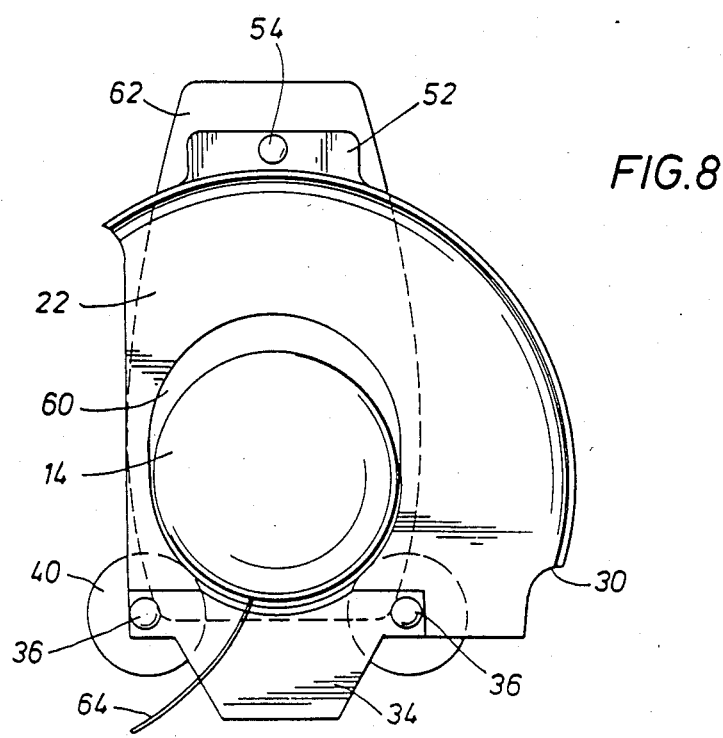
FIG. 8 is a side view of the alternate embodiment of the lawn trimmer attachment.
Figure 9:
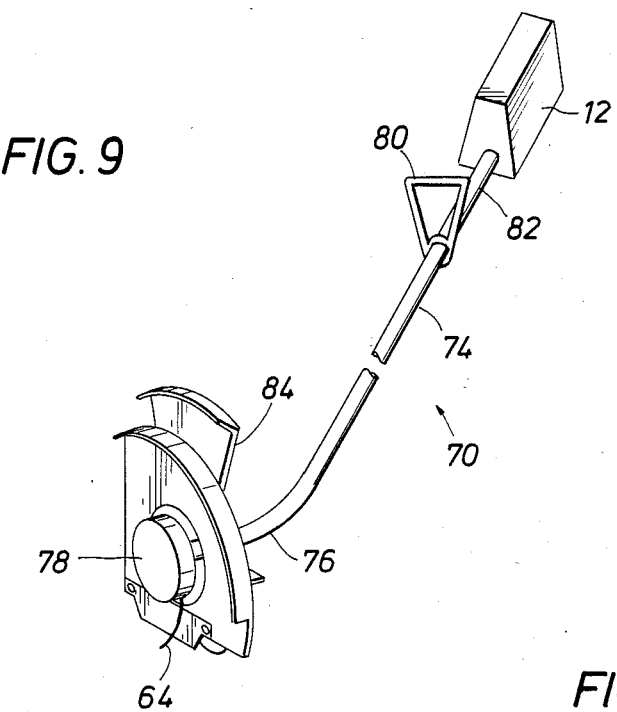
FIG. 9 is a perspective view of the invention attached to a gasoline powered nylon cord trimmer.

Referring now to FIGS. 7 and 8, an alternate embodiment of the lawn trimmer attachment of the invention is shown. The modified lawn trimmer attachment is substantially identical to the attachment 20 described and shown in FIGS. 1–4. Therefore, like reference numerals have been employed to identified like elements. In the alternate embodiment of FIGS. 7 and 8, the base plate 22 includes an oblong hole 60 for receiving the spool and line housing 14 therethrough. The oblong hole 60 is particularly suitable for some models of lawn trimmers, particularly earlier versions incorporating a housing 62 including a base which is oblong in profile. In the embodiment of FIGS. 7 and 8, the oblong hole 60 permits the spool and line housing 14 to be advanced through the opening 60 and the housing 62 lowered relative to the base plate 22 so that the nose portion thereof is received in the bracket 38. The oblong hole 60 permits the spool and line housing 14 to be moved vertically relative to the base plate 22 enabling the line trimmer attachment to be mounted to the base of the housing 62. As in the embodiment of FIGS. 1–4, a hole is drilled through the upper portion of the base of the housing 62 for receiving a bolt 49 therethrough to anchor the lawn trimmer attachment to the base of the housing 62 upon threading a wing nut 47 onto the bolt 49.

Referring now to FIGS. 9–14, an alternate embodiment of the lawn trimmer attachment of the invention is shown attached to a gasoline powered lawn trimmer. The gasoline powered lawn trimmer, generally identified by the reference numeral 70, includes a gasoline powered engine within a housing 72 mounted on the upper end of a shaft 74. The lower end of the shaft 74 is defined by a curved portion 76. It is understood, however, that the lower end of the shaft 74 may also be straight or angularly oriented. A spool and line housing 78 is mounted on the end of the curved portion 76. The spool and line housing 78 is operatively connected to the gasoline engine housed within the housing 72. A handle 80 and hand grip 82 are located about the shaft 74, providing a convenient hand hold for the operator of the lawn trimmer. The spool and line housing 78 includes a narrow wedge-shaped shield plate 84 extending upwardly from the back side thereof and mounted about the curved portion 76 of the shaft 74. To this point, a commercially available gasoline powered lawn trimmer has been described. The lawn trimmer attachment of the invention to be mounted on the trimmer 70 will be described in greater detail hereinafter.

Figure 12:
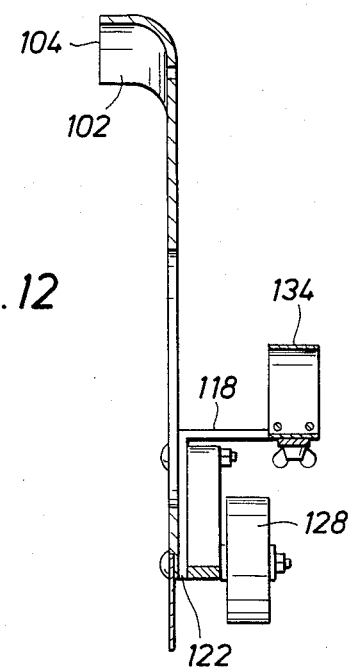
FIG. 12 is a sectional view of the lawn trimmer attachment taken along lines 12—12 of FIG. 10.
Figure 10:
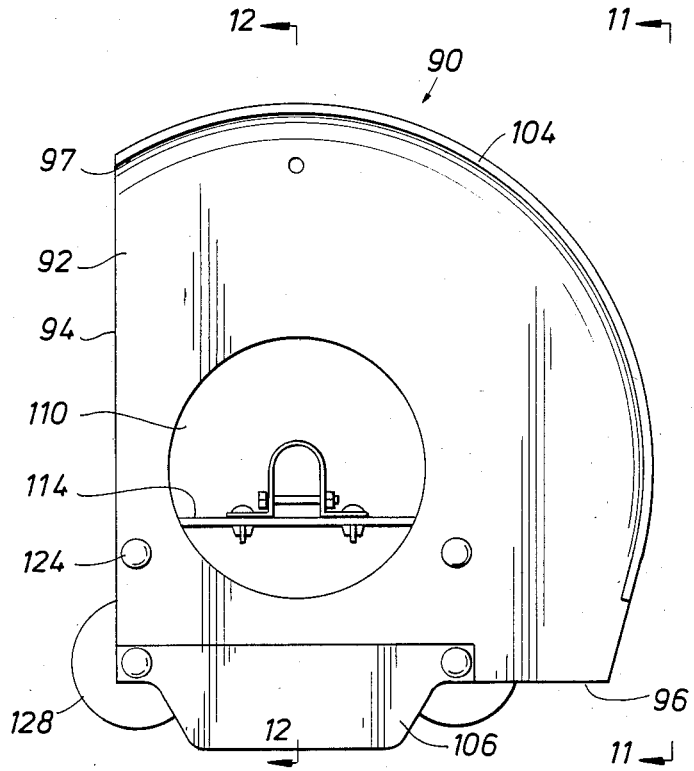
FIG. 10 is a side view of the lawn trimmer attachment shown in FIG. 9.
Figure 11:
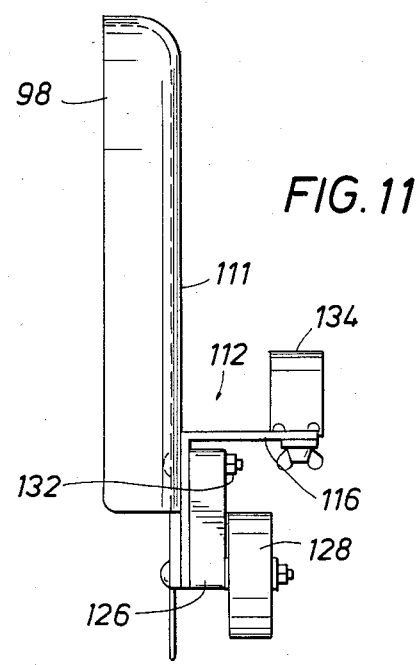
FIG. 11 is an end view of the lawn trimmer attachment.

Referring now to FIG. 10, the lawn trimmer attachment of the present disclosure for mounting to a gasoline powered lawn trimmer is generally identified by the reference numeral 90. The attachment 90 is substantially similar to the attachment 220 and comprises a substantially flat base plate 92. The base plate 92 is defined by a pair of straight edges 94 and 96 which intersect at right angles to form two sides of the base plate 92. A curved edge 97 joins the straight edges 94 and 96 defining a substantially flat pie-shaped surface very similar to the embodiment of FIG. 2. An upstanding deflection shield 98, best shown in FIGS. 11 and 12, is formed along the curved edge 97 extending from the distal or terminal end of the edge 94 to the edge 96. The deflection shield 98 terminates adjacent the edge 96 at an angled surface defining an edge 100 to which a cord cutter is affixed for trimming or cutting excessive lengths of line cord. The deflection shield 98 is integrally formed with the base plate 92 and includes a concave interior surface 102 extending upwardly from the base plate 92 and terminating at an edge 104 of the deflection shield 98. The concave surface 102 of the deflection shield 98 enables most grass clippings and debris to be deflected away from the base plate 92 and thereby away from the user of the lawn trimmer, much in the same fashion as described above regarding the embodiment of FIG. 2. An edge guide 106 is mounted to the base plate 92 by mounting bolts 108. The base plate 92 is provided with a substantially circular hole 110 for receiving the spool and line housing 78 therethrough.

The assembled lawn trimmer attachment 70, shown in FIGS. 9–14, includes an L-shaped bracket 112 which is mounted to the back surface 111 of the shield plate 92. The bracket 112 is a unitary piece which is L-shaped in end view as best shown in FIG. 15. The bracket 112 comprises an elongate member 114 having a pair of spaced arms 116 and 118 projecting therefrom and lying in a plane with the member 114 which is substantially perpendicular to the back surface 111 of the base plate 92. The arms 116 and 118 terminate at downwardly extending leg members 120 and 122. The leg members 120 and 122 depend downwardly at right angles from the bracket arms 116 and 118, respectively. The leg members 120 and 122 are provided with a pair of holes extending therethrough for alignment with holes formed in the base plate 92 for receiving bolts 108 and 124 therethrough. A spacer 126 is interposed between the legs 120 and 122 and the wheels 128. These components define the lower bracket assembly which is secured to the base plate 92 by nuts 130 and 132 threaded onto bolts 108 and 124, respectively.

The lawn trimmer attachment 90 is secured to the shaft 74 by a U-shaped connector 134 which is mounted about the shaft portion 76 adjacent the line and spool housing 78. The connector 134 i U-shaped in end view, as shown in FIG. 14. A pair of bolts 136 extend through the sides defining the connector 134 for securely mounting the connector 134 to the shaft portion 76. The connector 134 is mounted about the shaft portion 76 and the bolts 136 are inserted through aligned holes in the sides of the connector 134. Nuts 138 are threaded on the ends thereof to snugly attach the connector 134 to the shaft portion 76.

The connector 134 includes outwardly extending flanges 140 integrally formed therewith which extend substantially perpendicularly outwardly from the side members of the connector 134. The flange members 140 are provided with holes extending therethrough for alignment with holes extending through the member 114 of the bracket 112. Upon alignment of the holes, a bolt and wing nut or clevis pin and hitch pin clip arrangement is provided so that the lawn trimmer attachment 90 may be quickly and easily mounted to the shaft of the lawn trimmer 70. Alignment of the bracket holes substantially centers the shaft portion 76 relative to the opening 110 in the base plate 92. A bolt 142 and wing nut 144 anchor the upper portion of the base plate 92 to the shield plate 84 of the lawn trimmer 70.

Referring now to FIGS. 16-18, another alternate embodiment of the lawn trimmer of the invention is shown. In some lawn trimmers, particularly those used by lawn care companies, the shield plate extending from the spool and line housing has been removed, thereby leaving only the spool and line housing 78 projecting from the lower end of the shaft 74. It will be recalled that in the embodiment of FIG. 13, the upper end of the base plate 92 is anchored to the shield plate 84 by bolt 142 and wing nut 144. In the embodiment of FIG. 16, the shield plate 84 is not available and therefore a brace 150 is pivotally mounted to the back surface of the base plate 92. The bracket 150 comprises an elongate stiff member having one end pivotally mounted about a bracket 152 mounted to the back surface of the base plate 92. The bracket 152 is secured to the base plate 92 by a pair of rivets 154 or the like. The opposite end 156 of the brace 150 is angled downwardly for cooperation with an upstanding U-shaped lock bracket 158. The end 156 of the brace 150 includes a hole for alignment with a pair of holes extending through the lock bracket 158. A clevis pin 160 is received through the aligned holes. A hitch pin 162 secures the end 156 of the brace 150 to the lock bracket 158.

The lock bracket 158 defines a channel of sufficient width to fit about the connector 134 and is sandwiched between the connector 134 and the shaft 74 to maintain it in position. Alternatively, the lock bracket 158 may be welded or otherwise attached to the connector 134.

In FIG. 18, a support bracket, generally identified by reference numeral 165, is shown. The support bracket 165 is substantially identical to the bracket 112. The leg members 120 and 122, however, have been extended so that the connector 134 may be mounted further from the end of the shaft 74 to accommodate the brace 150. The support bracket 165 is provided with a brace member 166 extending between the leg members 120 and 122 for providing additional rigidity to the support bracket 165.

In FIGS. 19-21, yet another alternate embodiment of the lawn trimmer attachment of the invention is shown. Some commercially available lawn trimmers include a hub portion 170 which projects from the back of the spool and line housing 78. For the sake of convenience and quick connect and disconnect, the connector bracket 134 of the invention is mounted about the hub 170. The mounting bracket 172, shown in FIG. 21, comprises a pair of L-shaped bracket members 174 and 176. A cross member 178 connected to the bracket members 174 and 176 completes the mounting bracket 172. The cross member 178, as best shown in FIG. 20, is mounted to the connector 134 so that the hub 170 is retained therebetween. The cross member 178 includes a slight indention 180 profiled to the shape of the hub 170 for securely mounting the connector thereabout.

The cross member 178 is detachable from the brackets 174 and 176 and remains attached about the hub 170 when disconnected from the lawn trimmer attachment. In this manner, the lawn trimmer attachment of the invention may be easily and quickly mounted to the lawn trimmer by connecting the cross member 178 to the brackets 174 and 176. A pair of nuts and bolts or clevis pins and hitch pins are provided to enable attachment of the lawn edger attachment to the lawn trimmer.

In use, the lawn trimmer is positioned so that the edge guide 34 or 106 extends into the trench 35 separating the sidewalk and lawn. The wheels 40 or 128 are sized so that the trimmer housing and bracket assembly clear the surface of the sidewalk and do not drag therealong. If the nylon cord 64 is too long, it is cut off by the cord cutter so that a substantially uniform depth is edged as the lawn trimmer is guided along the sidewalk. This results in a uniform and straight edge being cut. In addition, the nylon cord 64 lasts much longer since it does not strike the concrete sidewalk or curb.

While the foregoing is directed to the preferred embodiments of the present invention, other and further embodiments of the invention may be devised without departing from the basic scope thereof, and the scope thereof is determined by the claims which follow.

What is claimed is:

1. An attachment for converting a lawn trimmer into a lawn edger, the lawn trimmer including a housing enclosing a gasoline engine mounted at one end of an elongate shaft, a line cutter head mounted at the opposite end of said shaft and a shield plate mounted on the elongate shaft, the attachment comprising:
   (a) a base plate detachably mounted to the elongate shaft in substantial planar contact with the shield plate, said base plate including a hole for receiving the spool and line housing therethrough;
   (b) a deflection shield extending along an arcuate edge of said base plate, said deflection shield being integrally formed with said base plate and protruding outwardly therefrom, said deflection shield defining a curved surface projecting from said base plate for deflecting grass clippings and debris outwardly from said base plate;
   (c) an edge guide depending downwardly from a bottom edge of said base plate for guiding the lawn trimmer along a path;
   (d) bracket means for detachably mounting said base plate to said elongate shaft; and
   (e) wheel means supported on said bracket means for rolling the lawn edger along a path.

2. The apparatus of claim 1 wherein said curved surface of said deflection shield is formed by a concave surface projecting from said base plate along said arcuate edge of said base plate for deflecting debris outwardly and away from said base plate.

3. The apparatus of claim 1 wherein said deflection shield includes a cord cutter at one end thereof.

4. The apparatus of claim 1 wherein said bracket means includes a unitary bracket connecting said base plates to said elongate shaft.

5. The apparatus of claim 1 including a bolt extending through aligned holes in said base plate and the lawn trimmer shield plate fastened by a wing nut threaded on said bolt for anchoring said base plate to the shield plate.

6. The apparatus of claim 1 wherein said edge guide projects downwardly from said base plate into a trench formed along a sidewalk for engaging the sidewalk to guide the lawn edger along the sidewalk.

7. The apparatus of claim 1 wherein said edge guide, said bracket means, and said wheel means form a lower assembly mounted to said base plate by bolts extending through said lower assembly, at least two of said bolts providing an axis of rotation for said wheel means.

8. The apparatus of claim 4 wherein said bracket means further includes a connector cooperating with said unitary bracket for mounting said base plate to said elongate shaft.

9. The apparatus of claim 8 wherein said connector is detachably mounted about said elongate shaft and includes outwardly extending flange members including holes extending therethrough for alignment with holes in said unitary bracket for receiving connecting bolts therethrough for mounting said connector on said unitary bracket.

10. The apparatus of claim 1 wherein said bracket means comprises a pair of substantially L-shaped bracket members mounted to said base plate and a cross member detachably connected to said bracket member.

11. The apparatus of claim 10 wherein said bracket means further includes a connector journaled about said elongate shaft and mounted on said cross member of said bracket means.

12. The apparatus of claim 1 wherein said bracket means comprises a pair of L-shaped bracket members and a cross member detachably connected to said bracket members for connection to a hub portion of said line cutter head.

13. An attachment for converting a lawn trimmer into a lawn edger, the lawn trimmer including a housing enclosing a gasoline engine mounted at one end of an elongate shaft, and a spool and line housing mounted at the opposite end of said shaft, the attachment comprising:
   (a) a base plate detachably mounted about the elongate shaft adjacent the spool and line housing, said base plate including a hole for receiving the spool and line housing therethrough;
   (b) a deflection shield extending along an arcuate edge of said base plate, said deflection shield being integrally formed with said base plate and protruding outwardly therefrom, said deflection shield defining a curved surface projecting from said base plate for deflecting grass clippings and debris outwardly from said base plate;
   (c) an edge guide depending downwardly from a bottom edge of said base plate for guiding the lawn trimmer along a path;
   (d) bracket means for detachably mounting said base plate to said elongate shaft; and
   (e) wheel means supported on said bracket means for rolling the lawn trimmer along a path.

14. The apparatus of claim 13 wherein said bracket means includes a unitary bracket connecting said base plate to said elongate shaft.

15. The apparatus of claim 14 wherein said bracket means further includes a connector cooperating with said unitary bracket for mounting said base plate to said elongate shaft.

16. The apparatus of claim 15 wherein said bracket means includes an angularly extending brace pivotally connected at one end to said base plate and at the other end to said connector.

17. The apparatus of claim 16 wherein said connector includes an upstanding lock bracket for locking said other end of said brace to said connector.

18. The apparatus of claim 14 wherein said unitary bracket includes a brace member extending between leg members of said unitary bracket.

19. The apparatus of claim 13 wherein said bracket means comprises a pair of L-shaped bracket members and a cross member detachably connected to said bracket members for connection to a hub portion of said line cutter head.

* * * * *

UNITED STATES PATENT AND TRADEMARK OFFICE
CERTIFICATE OF CORRECTION

PATENT NO. : 4,803,831

DATED : February 14, 1989

INVENTOR(S) : BENJAMIN C. CARMINE

It is certified that error appears in the above-identified patent and that said Letters Patent is hereby corrected as shown below:

Column 4, line 44, change "S5" to --35--.

Column 6, line 21, change "220" to --20--.

Column 7, line 4, change "i" to --is--.

Signed and Sealed this

Nineteenth Day of December, 1989

Attest:

JEFFREY M. SAMUELS

*Attesting Officer*  *Acting Commissioner of Patents and Trademarks*